United States Patent [19]

Hashimoto et al.

[11] Patent Number: 4,574,303
[45] Date of Patent: Mar. 4, 1986

[54] WHITE BALANCE CONTROL SYSTEM FOR COLOR TELEVISION CAMERA WITH AUTOMATIC SWITCHOVER CONTROL

[75] Inventors: Takaaki Hashimoto, Noda; Ryuzo Motoori, Kawasaki; Kazushi Minagawa, Yokohama, all of Japan

[73] Assignee: Nippon Kogaku K.K., Tokyo, Japan

[21] Appl. No.: 506,459

[22] Filed: Jun. 21, 1983

[30] Foreign Application Priority Data

Jun. 24, 1983 [JP] Japan ................................. 57-107664

[51] Int. Cl.$^4$ ............................................. H04N 9/73
[52] U.S. Cl. ..................................................... 358/29
[58] Field of Search ........................................... 358/29

[56] References Cited

U.S. PATENT DOCUMENTS

| 3,627,911 | 12/1971 | Kubota | 358/29 |
| 4,219,841 | 8/1980 | Nishimura et al. | 358/29 |
| 4,454,532 | 6/1984 | Itani et al. | 358/29 |

FOREIGN PATENT DOCUMENTS

| 158127 | 12/1979 | Japan | 358/29 |
| 46685 | 4/1980 | Japan | 358/29 |

Primary Examiner—John W. Shepperd
Attorney, Agent, or Firm—Fleit, Jacobson, Cohn & Price

[57] ABSTRACT

In a color television camera of the type in which the white balance is subjected to automatic follow-up adjustment during the shooting in accordance with the color temperature of an object illuminating light detected by light sensors provided independent of the imaging means, the adjusted condition of the white balance is maintained constant as desired. The TV camera includes change-over switch for switching the white balance control mode between the automatic follow-up mode and the memory mode, memory means for locking the white balance which has been adjusted automatically in the then current condition in response to the change-over to the memory mode, and a controller whereby when the shooting preparatory operation is started with the memory mode being selected the white balance control mode is always changed over to the automatic follow-up mode first thereby effecting the white balance adjustment. Particularly, this change-over to the automatic mode occurs when the power source is coupled to the camera.

9 Claims, 15 Drawing Figures

WHITE BALANCE CONTROL SYSTEM FOR COLOR TELEVISION CAMERA WITH AUTOMATIC SWITCHOVER CONTROL

BACKGROUND OF THE INVENTION

The present invention relates to color television cameras (hereinafter referred to as TV cameras) and more particularly to improvements in the white balance control system for TV cameras.

In the field of the automation of white balance control for TV cameras, a method has been proposed in which color temperature detecting light sensors having substantially the same red (R), green (G) and blue (B) imaging characteristics as the imaging devices of a TV camera and are capable of detecting a wider range of color temperatures than the angle of view of the phototaking lens of the TV camera and are arranged within or on the TV camera independent of the imaging devices therein whereby the changes in the color temperature of the light illuminating an object to be picked up is continuously detected by the light sensors and the gains of the TV camera color signals are continuously controlled in accordance with the detection results thereby automatically adjusting the white balance. This method has a great advantage in that even if the color temperature of the object illuminating light is changed due to the paning or tilting of the TV camera during the shooting, the white balance control unit is brought into operation and the desired follow-up adjustment is effected thereby making it possible to always shoot the object with the proper white balance adjustment without interrupting the shooting operation. This operating mode of the white balance control unit is referred to as an automatic follow-up mode in the description to follow.

A handy-type TV camera of the automatic follow-up white balance adjustment type is based on the assumption that if an object is picked up with a wide angle of view, it can be considered that the R, G and B color components included in the object are practically equal in amount. While it has been confirmed by experiments that this assumption is substantially satisfied in the ordinary photographing applications, the TV camera is used for a wide variety of purposes and the assumption cannot be satisfied in some special applications. A typical example of such special applications is a closeup photography. Let consider the case where a small insect resting on a wall is shot by the TV camera. In this case, if there is an extreme difference in extent between the photographing range corresponding to the angle of view of the phototaking lens and the color temperature detection range, the above-mentioned assumption is not satisfied so that if the color of the wall is red, for example, the white balance control unit is operated in such a manner that the gain of the R-component color signal is reduced and conversely the gain of the B-component color signal is increased to the maximum thereby producing a picture having an extremely bluish color tone.

Of course, the failure of the assumption is not limited to the above-mentioned close-up photography, that is, the assumption cannot be satisfied and the white balance will be destroyed generally in cases where any particular chromatic color occupies a large part of the detection range of the color temperature detecting light sensors in contrast to the color distribution within the photographing range.

In order to overcome the foregoing deficiencies, it is possible to operate the white balance control unit in an operating mode (hereinafter referred to as a memory mode) in which the outputs of the light sensors are stored and the gains of the color signals are maintained constant. In this case, while the difficulties of the previously mentioned automatic follow-up mode can be overcome, other difficulties, such as, the clearing of the stored contents of the memory upon the disconnection of the power source during the operation in the memory mode, the delay in response of the color temperature detecting sensors if the power source is connected while maintaining the memory mode and the delay in signal transmission due to other circuit elements are caused, thereby causing the white balance to deviate.

SUMMARY OF THE INVENTION

It is the primary object of this invention to provide a TV camera having a memory mode in which the color temperature detected by color temperature detecting light sensors is stored and the gains of color signals are controlled in accordance with the stored color temperature and adapted to electrically or mechanically change over the memory mode to the automatic follow-up mode.

To accomplish the above and other equally important objects, in accordance with the present invention there is thus provided a TV camera of the type which includes light sensors for detecting changes in the color temperature of a light illuminating an object to be picked up and a white balance control unit adapted to be controlled by the outputs from the light sensors and operable in an automatic followup mode which subjects the white balance to an automatic follow-up control in accordance with the changes in the color temperature during the photographing. The TV camera includes a mode changing selector means for changing over the operating mode of the white balance control unit to a memory mode and memory means responsive to the selection of the memory mode to maintain the gains of the color signals at the current values, whereby in order to prevent the TV camera from just operating in the memory mode when the preparatory operation for the photographing by the TV camera is initiated after the selection of the memory mode by the selector means, as for example, the TV camera is brought into operation only after the stable detection of the color temperature of the object illuminating light in the automatic follow-up mode. Note that the starting of the preparatory operation for the photographing by the TV camera includes the connection of the power source to the camera or the operation of a photographing trigger switch.

In accordance with a first embodiment of the invention, the TV camera further includes timer means whereby in accordance with the above-mentioned feature, with the memory mode selected by the selector means, when the power source is connected, the operating mode of the white balance control unit is changed to the automatic follow-up mode for a predetermined period and then it is changed to the memory mode.

In accordance with a second embodiment, the TV camera further includes control means whereby in accordance with the similar feature, with the memory mode selected by the selector means, when the power source is connected, the operating mode of the white balance control unit is changed to the automatic follow-up mode and it is then changed to the memory mode in association with the operation of the trigger switch for starting the shooting.

In accordance with a third embodiment, the TV camera further includes control means whereby in accordance with the similar feature, with the memory mode selected by the selector means, when the power source is connected or disconnected, the selector means is operated to forcibly select any other mode than the memory mode.

Thus, in accordance with the TV camera of the present invention, even if the operator attempts to shoot when the mode selector means is set to select the memory mode, a power supply switch is operated so that the memory mode is released and the white balance control unit is automatically or manually set to any of other mode including the automatic follow-up mode for a predetermined period, until the trigger switch is first operated for starting the photographing or until the mode selector means is operated again. Thus, by utilizing this function, the gains of color signals can be maintained constant in correspondence to any given shooting condition through a simple operation and also the gains of color signals can be adjusted to obtain the desired white balance in a condition where the previously mentioned assumption is not satisfied, e.g., in the case of a special shooting condition. Further, there is no danger of the gains of color signals being deviated even if the power source is connected with the memory mode being selected.

The above and other objects as well as advantageous features of the invention will become more clear from the following description taken in conjunction with the drawings.

DESCRIPTION OF THE PREFERRED EMBODIMENTS

Figure 1:
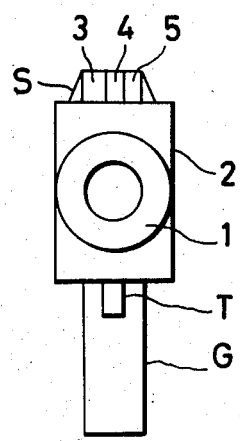
FIG. 1 is a front view of a TV camera including a white balance control unit operable in an automatic follow-up mode.

In FIG. 1 showing a front view of a TV camera including a white balance control unit which is operable in an automatic follow-up mode, numeral 1 designates a phototaking lens, and 2 a TV camera proper. Mounted on the upper front face of the camera proper 2 is a color temperature detecting light sensor S which includes an R light sensor element 3 for sensing the amount of the R component in an incident light, a G light sensor element 4 for similarly sensing the amount of the G component in the incident light and a B light sensor element 5 for similarly sensing the amount of the B component in the incident light through a light diffusing plate mounted on the surface exposed to the incident light for allowing the incidence of a wide range of light rays. Designated at G is a grip, and T is a trigger switch for controlling the shooting operation.

Figure 2:
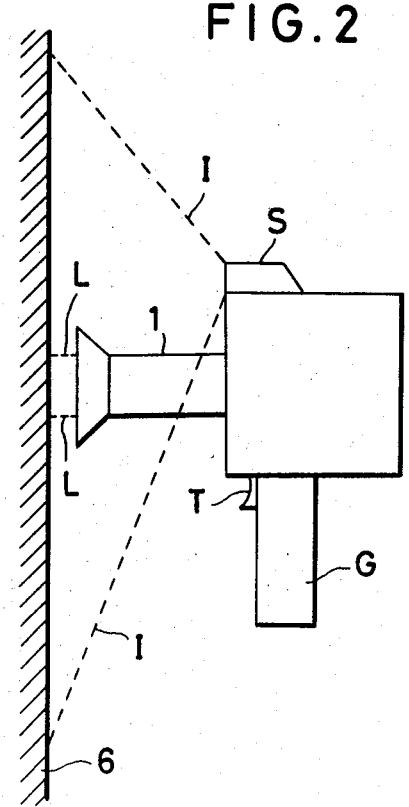
FIG. 2 is a side view showing the conditions of the TV camera of FIG. 1 during the close-up shooting.

FIG. 2 is a side view of the TV camera of FIG. 1 which is positioned opposite to a wall 6. Designated at L is the range of photographing by the TV camera which corresponds to the angle of view of the phototaking lens, and I the extent of the color temperature detection range of the light sensor S. There are cases where the photographing range and the color temperature detection range extremely differ in extent form each other as in the case of FIG. 2.

Figure 3A:
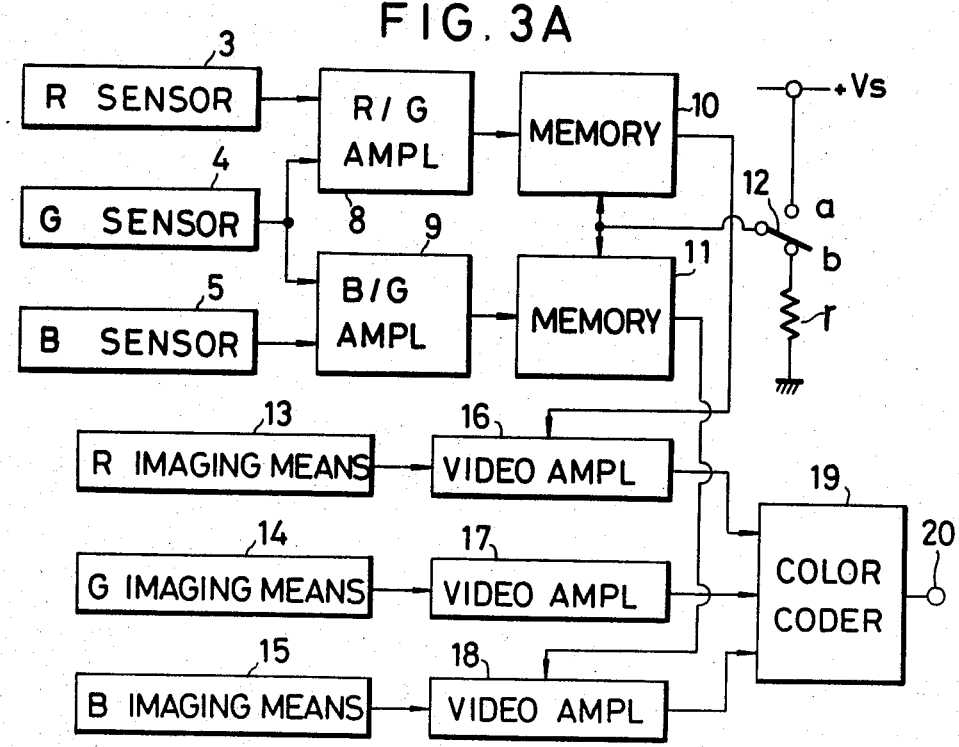
FIGS. 3A and 3B are block diagrams showing the constructions of different examples of a TV camera having an automatic follow-up mode and a memory mode to which the present invention is applied.

FIG. 3A is a block diagram showing the principal parts of a TV camera to which the invention is applicable and including a white balance control unit whose operating mode is switchable between an automatic follow-up mode and a memory mode, and light sensors 3, 4 and 5 which are similar to those mentioned in connection with FIG. 1 are provided independently of imaging means 13, 14 and 15 of the camera. An operational amplifier 8 computes a ratio R/G of the outputs from the light sensors 3 and 4 and another operational amplifier 9 computes a ratio B/G of the outputs form the light sensors 5 and 4. The outputs from the operational amplifiers 8 and 9 are respectively stored in memory circuits 10 and 11. A mode selector switch 12 is selectively switchable to an automatic follow-up mode which applies a voltage +VS (hereinafter referred to as an H signal) as a control signal to the memory circuts 10 and 11 and to a memory mode which applies the ground voltage (hereinafter referred to as an L signal) to the memory circuits 10 and 11 through a resistor r. When the H signal is applied as a control signal to the memory circuits 10 and 11 in the automatic follow-up mode, the memory circuits 10 and 11 are reset without performing any memory action and thus the output values of the operational amplifiers 8 and 9 are just passed therethrough. On the other hand, when the L signal is supplied as a control signal to the memory circuits 10 and 11 in the memory mode, the memory circuits 10 and 11 respectively store the then current output values of the operational amplifiers 8 and 9.

As will be described later, each of the memory circuits 10 and 11 comprises, for example, a capacitor for storing the output of the operational amplifier 8 or 9 and a switch circuit responsive to the H signal through the switch 12 so as to be turned on to apply the output of the operational amplifier 8 or 9 to the capacitor and responsive to the L signal so as to be turned off to store the output in the capacitor.

In FIG. 3A, the automatic follow-up mode is selected when the selector switch 12 is connected to its contact a and the memory mode is selected when the selector switch 12 is connected to its contact b.

The imaging means 13, 14 and 15 are respectively provided for R, G and B color components and they are shown as the imaging means of a so-called three tube-type TV camera.

The outputs from the imaging means 13, 14 and 15 are respectively amplified to a predetermined magnitude by video amplifiers 16, 17 and 18 and are then supplied as the regular video signals to a color coder 19 which in turn combines the signals and delivers to an output terminal 20 as a composite color signal according to a standard television system such as the NTSC system. In this case, each of the R signal video amplifier 16 and the B signal video amplifier 18 has a variable gain control function of the voltage control type and performs a gain control in accordance with the output from the associated memory circuit 10 or 11.

It is assumed now that the system including the operational amplifier 8 and the video amplifier 16 and the system including the operational amplifier 9 and the video amplifier 18 are adjusted so that when a white or achromatic object illuminated by an illuminating light of a reference color temperature (e.g., 3200° K.) is detected by the light sensors 3, 4 and 5 and the imaging means 13, 14 and 15, the output signals from the video amplifiers 16, 17 and 18 become equal in amplitude, that is, a so-called white balanced condition is established.

Where such an adjusted TV camera is used in the automatic follow-up mode to shoot an object, the R, G and B light sensors 3, 4 and 5 generate the detection signals corresponding to the color components of the incident light of a wide angle of view and the detection signals are respectively applied to the operational amplifiers 8 and 9. As a result, the ratio R/G between the R and G detection signals and the ratio B/G between the B and G detection signals are computed and applied to the memory circuits 10 and 11, respectively. As a result, these ratio signals indicate a white balance error at a given color temperature. In this case, since the outputs from the imaging means 13, 14 and 15 vary with changes in the color temperature in the like manner as the outputs from the light sensors 3, 4 and 5, if a control and adjustment are effected such that the ratio signals are passed through the memory circuits 10 and 11 without being stored and are applied as variable gain control signals to the video amplifiers 16 and 18 thereby causing their gains to decrease with increase in the signals from the operational amplifiers 8 and 9, the white balance can be adjusted automatically and continuously. In other words, when a scene of a high color temperature is picked up, the B signal from the light sensor 5 increases and the R signal from the light sensor 3 decreases. As a result, the output signal from the operational amplifier 8 decreases and the output signal from the operational amplifier 9 increases. Thus, as mentioned previously, the gain of the video amplifier 16 increases thus increasing the R signal and the gain of the video amplifier 18 decreases thus decreasing the B signal. Consequently, the desired white balance corresponding to the particular color temperature is automatically provided and the video color signals are combined by the color coder 19 thereby generating the regular color signal at the output terminal 20. In the like manner, the control reverse to what has been described is effected automatically in the case of a televised scene of a low-color temperature.

Then, when the memory mode is selected by the mode selector switch 12 mounted on the TV camera, a memory command signal or L signal is supplied to the memory circuits 10 and 11 and the output values of the operational amplifier at that instant are respectively stored in the memory circuits 10 and 11.

Thereafter, the gains of the video amplifiers 16 and 18 are determined only in accordance with the stored values irrespective of changes in the outputs from the light sensors 3, 4 and 5 until the operating mode is again set to the automatic follow-up mode by the mode selector switch 12 thereby resetting the stored contents of the memory circuits 10 and 11. As a result, before coming into a shooting operation where the previously mentioned assumption cannot be satisfied, e.g., close-up photographing, the operator may preliminarily stand apart at the proper distance from an object or change the direction of the light sensors to establish a condition as if the light sensing portions of the light sensors were directed toward an ordinary scene which satisfies the assumption and set the mode selector switch 12 to the memory mode in this condition, thereby shooting the object with the same effect as if the white balance adjustment were effected by means for example of the gray scale in the conventional TV camera. As a result, there is no danger of being affected by the color of the wall in the shooting under the previously mentioned special condition and therefore the white balance adjustement can be easily effected by effectively utilizing the outputs of the light sensors in the shooting of any scene. Also, as regards the operation in the memory mode, it is possible to provide, for example, mean for detecting the position of the selector switch so as to generated in the viewfinder (irrespective of whether it is of the optical or electronic type) of the TV camera a signal of some kind which indicates that the white balance control unit is operating in the memory mode and in this way the operator is enabled to easily determine the current operating condition and thereby to prevent the occurrence of any erroneous operation and effectively utilize these operating modes in the proper manner.

Figure 3B:
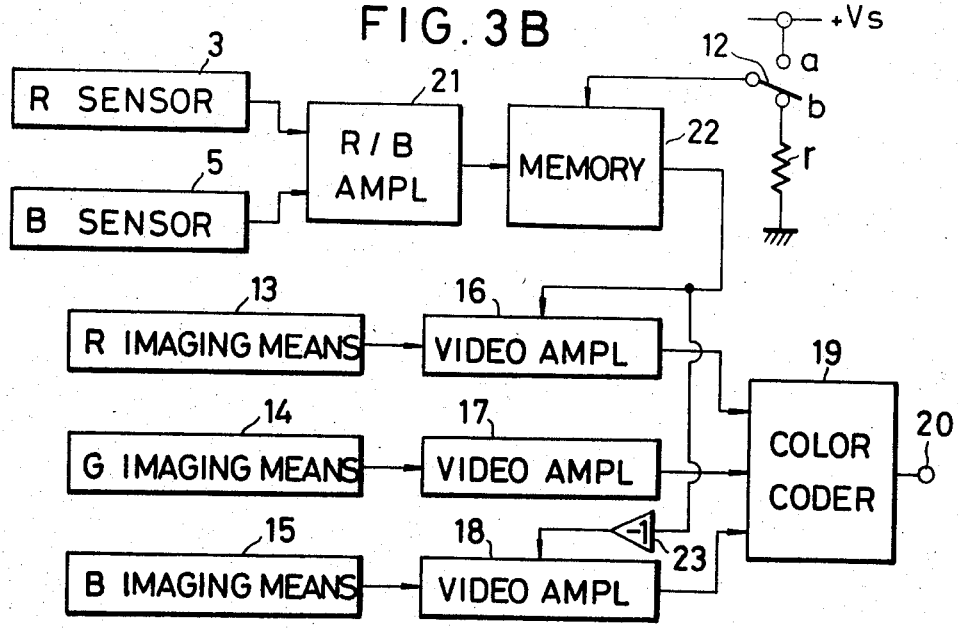

FIG. 3B is a block diagram showing another example to which the invention is applicable and the TV camera of this Figure is the same with that of FIG. 3A in that the white balance control unit is selectively operable in the automatic follow-up mode and the memory mode. While, in the case of FIG. 3A, the R, G and B sensors are used to sense changes in the color temperature and thereby effect the white balance adjustment with a high degree of accuracy, the apparatus inevitably becomes complicated and the cost rather tends to increase. The TV camera of FIG. 3B overcomes these dificiencies by using only the R and B light sensors 3 and 5 for color temperature change detecting purposes.

Figure 10:
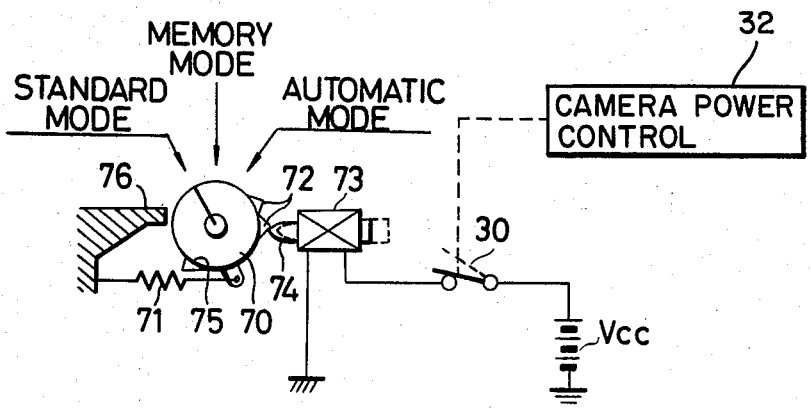
FIG. 10 is a schematic diagram showing the principal parts of another embodiment of a mechanical type of the invention.
Figure 11:
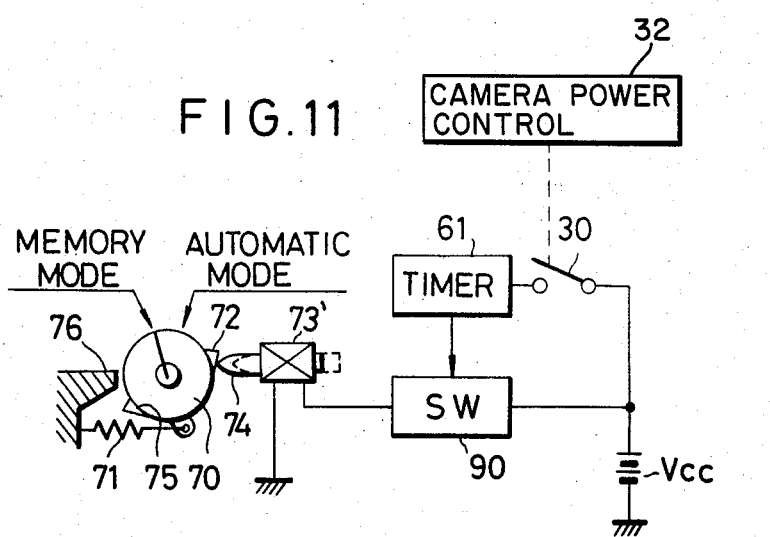
FIG. 11 is a schematic diagram showing the principal parts of another embodiment of a mechanical type of the invention.

In FIG. 3B in which the component elements equivalent to those of the TV camera of FIG. 3A are designated by the same reference numerals, numeral 21 designates an operational amplifier for computing the ratio R/B between R and B signals, 22 a memory circuit capable of storing the output of the operational amplifier 21 in the like manner as the memory circuits of FIGS. 10 and 11 in FIG. 3A, and 23 a buffer for inverting the polarity of the signal from the memory circuit 22.

Assuming now that the desired white balance is obtained at a reference color temperature (e.g., 3200° K.) as in the case of FIG. 3A, when the color temperature of an object illuminating light becomes higher than the reference (3200° K.), the output of the light sensor 5 or the B component is increased so that the output R/B of the operational amplifier 21 is decreased and the gain of the R video amplifier 16 is increased as in the case of FIG. 3A. On the other hand, the gain of B video amplifier 18 is decreased due to the application of the output R/B generated from the operational amplifier 21 and inverted in polarity by the buffer 23. As a result, the R signal is increased and the B Signal is decreased thereby generating a white balanced signal at the terminal 20. In the case of a scene having a lower color temperature, the control reverse to what has been described is effected and the white balance adjustment is effected automatically. Also, it is needless to say that the operation in the memory mode is performed in the same manner as in the case of FIG. 3A.

Figure 4:
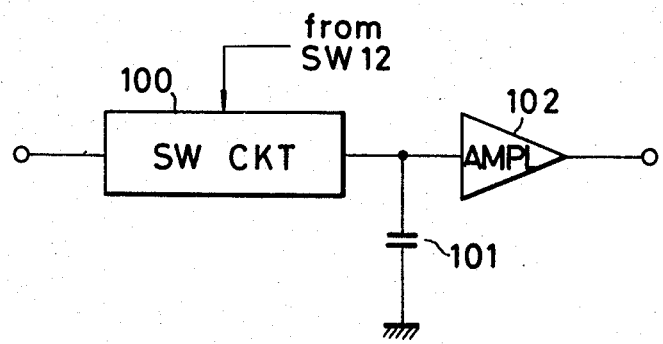
FIG. 4 is a block diagram showing a memory circuit.

FIG. 4 is a block diagram showing an example of the circuit construction of the memory circuits 10 and 11 or 22. A switch circuit 100 is adapted to be turned on or off in response to the H signal or L signal from the selector switch 12. A capacitor 101 stores the output from the operational amplifier 8, 9 or 21 through the switch circuit 100 and applies it to an amplifier 102. The output from the amplifier 102 corresponds to the output signal from the memory circuit 10, 11 or 22.

With the TV camera capable of the switching between the automatic follow-up mode and the memory mode as in the case of FIG. 3A or 3B, consider the case in which with the mode selector switch 12 connected to the contact b or set to the memory mode, the power source of the TV camera is disconnected and the power source is connected again in that condition.

While the performance of the above operation in FIG. 3A or 3B causes the memory circuits 10 and 11 or the memory circuit 22 to store the outputs of the operational amplifiers 8 and 9 or the output of the operational amplifier 21 upon the connection of the power source, the operational amplifier output or outputs at that time are not ones which are based on the color temperature of the incident light at that time due to the delay in the response of the light sensors 3, 4 and 5, the signal delay due to the circuit elements, etc. As a result, the white balance is deviated when the above-mentioned operation is performed.

Figure 5:
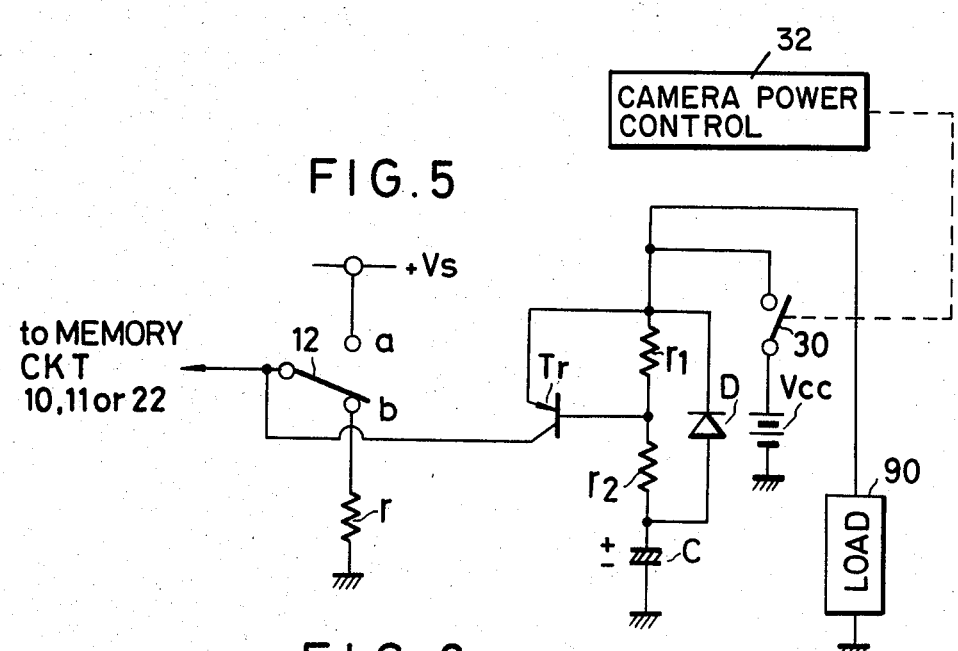
FIGS. 5 and 6 are circuit diagrams showing respectively the principal parts of preferred embodiments of the invention.
Figure 6:
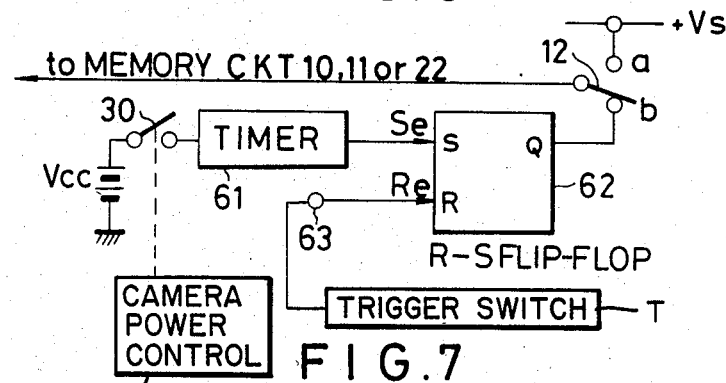

FIGS. 5 and 6 show circuits for the principal part of the invention which enable the white balance adjustment even if the above-mentioned operation is performed. The circuit of FIG. 5 is connected to the junction point between the mode selector switch 12 and the memory circuits 10 and 11 or the memory circuit 22 in the TV camera shown in FIGS. 3A or 3B, and the circuit of FIG. 6 is connected to the memory mode contact of the mode selector switch 12 in the TV camera shown in FIGS. 3A or 3B.

In FIG. 5, a dc power supply Vcc is connected through a power supply switch 30 to a series circuit including resistors $r_1$ and $r_2$ and a capacitor c and connected across the series circuit of the resistors $r_1$ and $r_2$ is a diode D which is opposite in polarity to the power supply to discharge the charge on the capacitor C via a load 90 when the circuit is reset. A PNP transistor $T_r$ is controlled by the voltage drop across the resistor $r_1$ and its collector is connected to the junction point between the mode selector switch 12 and the memory circuits 10 and 11 or the memory circuit 22.

Now assume that the circuit of FIG. 5 is connected to the TV camera of FIGS. 3A or 3B. The power source of the TV camera is connected and disconnected by a camera power control 32. If the power source 31 is connected by control 32 in the condition where the mode selector switch 12 is connected to the contact b thus selecting the memory mode, the power supply switch 30 of FIG. 5 is simultaneously closed so that a charging current flows to the capacitor C from the power supply $V_{cc}$ through the resistors $r_1$ and $r_2$ and the transistor $T_r$ is turned on for a predetermined time. When the transistor $T_r$ is turned on, the voltage from the power supply $V_{cc}$ or the H signal is supplied to the memory circuits 10 and 11 or the memory circuit 22 and the memory circuits or circuit does not perform the memory action. When the predetermined time expires, the transistor $T_r$ is turned off so that the ground voltage or the L signal at the memory mode contact b of the mode selector switch 12 is supplied to the memory circuits 10 and 11 or the memory circuit 22 and the then current outputs of the operational amplifiers 8 and 9 or the output of the operational amplifier 21 is stored thus maintaining the gains of the video amplifiers 16 and 18 constant. In other words, the circuit shown in FIG. 5 is a kind of timer circuit which generates a memory command signal (L signal) at the expiration of a predetermined time after the connection of the power source.

Considering the delay time due to the light sensors 3, 4 and 5 and the operational amplifiers 8 and 9 or 21, etc., the preset time of the timer circuit may be selected several seconds, for example.

The circuit of FIG. 6 is adapted for connection to the TV camera of FIGS. 3A or 3B in place of the circuit of FIG. 5 and in this case the effect of the circuit shown in FIG. 5 can be improved further.

In other words, where the timer circuit of FIG. 5 is connected, if, for example, the power source is connected through the operation of the power supply switch mounted on the VTR for the purpose of the heat-up prior to the shooting while accommodating the TV camera in the camera bag and if the timer preset time expires, the gains of the video amplifiers 16 and 18 are adjusted in accordance with the incident light to the light sensors 3, 4 and 5 at a time when the TV camera is placed in the bag and thus there is the danger of shooting the object with the degraded white balance in the actual shooting.

This deficiency is overcome by the circuit of FIG. 6 in which numeral 61 designates a timer circuit similar to that shown in FIG. 5, and 62 an R-S flip-flop. The timer circuit 61 is designed so that when the power source of the TV camera is connected by camera power central 32, the H signal is always generated first and the L signal is generated after the expiration of a predetermined time. The output from the timer circuit 61 is applied to the set input terminal Se of the flip-flop 62 so that if the H signal is applied to the set. input terminal Se, the flip-flop 62 delivers the H signal to its output terminal Q and the contact b of the mode selector switch 12 goes to the H or high level. The flip-flop 62 receives through a terminal 63 the trigger signal from the trigger switcht operated in response to the shooting starting operation of the TV camera, so that when the trigger signal is applied to its reset input terminal Re, the flip-flop 62 delivers the L signal to the output terminal Q and the contact b goes to the L or low level. Thus, where the circuit of FIG. 6 is incorporated in the TV camera of FIGS. 3A or 3B, if the power supply is switched off with the mode selector switch 12 being connected to the contact b or the memory mode being selected and then the power supply is switched on again, the timer circuit first generates the H signal for the predetermined time and the H signal appears at the output terminal of the R-S flip-flop 62. If the output of the timer circuit 61 becomes the L signal after the expiration of the predetermined time, the H signal at the output terminal Q of the flip-flop 62 remains unchanged. Thus, since the H signal is supplied to the memory circuits 10 and 11 (FIG. 3A) or the memory circuit 22 (FIG. 3B) through the mode selector switch 12, in this condition the gain control of the color signals in the TV camera is effected in the automatic follow-up mode even though the mode selector switch 12 is set to the memory mode. Then, when the shooting starting operation of the TV camera or the operation of the trigger switch applies a trigger signal to the reset input terminal Re of the R-S flip-flop 62 through the terminal 63 so that the R-S flip-flop 62 is reset, the L signal appears at its output terminal Q and the L signal is supplied to the memory circuit(s) through the selector switch 12 thereby causing the TV camera to effect the shooting operation in the memory mode.

In this way, there is no danger of the memory mode being selected with the TV camera accommodated in the bag or the like and the change-over to the memory mode is effected at the time of the actual shooting starting operation in response to the shooting starting operation.

Figure 7:
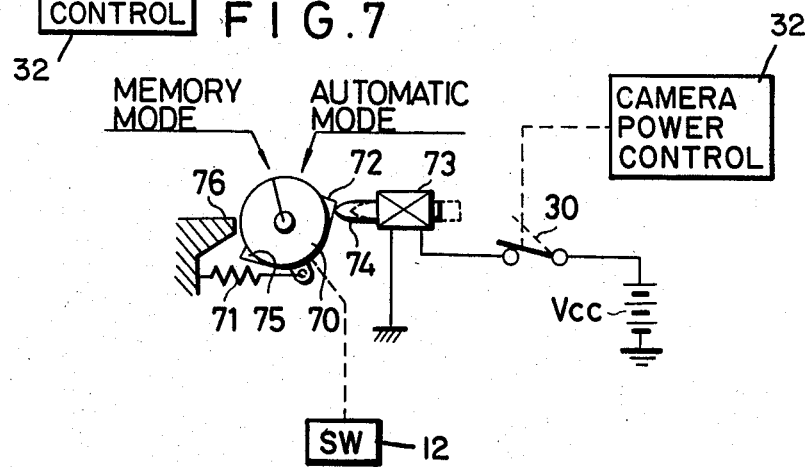
FIG. 7 is a schematic diagram showing the principal parts of another embodiment of a mechanical type of the invention.

The embodiment of FIG. 5 can be improved from the mechanical point of view and FIG. 7 shows an embodiment of a mechanism applicable to the TV cameras of FIGS. 3A and 3B.

In FIG. 7, a solenoid 73 is connected to the power supply $V_{cc}$ through the power supply switch 30 and a plunger 74 of the solenoid 73 is positioned near the periphery of a disk 70 fixedly mounted on the same shaft as the operating dial which is not shown and arranged in place in the TV camera so as to operate the mode selector switch 12. The disk 70 is biased in a clockwise direction by a spring 71 and a two-slope-sided projection 71 formed on the outer periphery of the disk 71 so as to engage with the plunger 74 operable in response to the energization of the solenoid 73 and thereby stop the clockwise rotation of the disk 70. Numeral 75 designates another projection for establishing a final stop position which prevents the disk 70 from rotating excessively due to the spring 71 when the plunger 74 is disengaged with the projection 72, and the projection 75 stops the rotation of the disk 70 by abutting against a stopper 76 on the fixed portion of the TV camera proper.

FIG. 7 shows the condition where the mode selector switch 12 is set to the memory mode. In the memory mode, when the power supply switch 30 is opened, the solenoid 73 is deenergized so that the plunger 74 is moved to the right in the Figure and it is disengaged with the projection 72. Thus, the disk 70 is rotated in the clockwise direction and the projection 75 abuts against the stopper 76 to stop. This position is one for the automatic follow-up mode and the TV camera always functions in the automatic follow-up mode when the power source 31 is disconnected by connection means 32. As a result, the previously mentioned troubles cannot take place when the power source 31 is connected again. With the power source connected, if the mode selector switch 12 is operated, the change-over operation is not impeded due to the two-slope-sided shape of the projection 72. Note that this embodiment may be modified so that upon connecting the power source 31 the solenoid 73 is energized for a predetermined time and the plunger 73 is moved to the right, and this construction will be described with reference to FIG. 11.

Figure 8A:
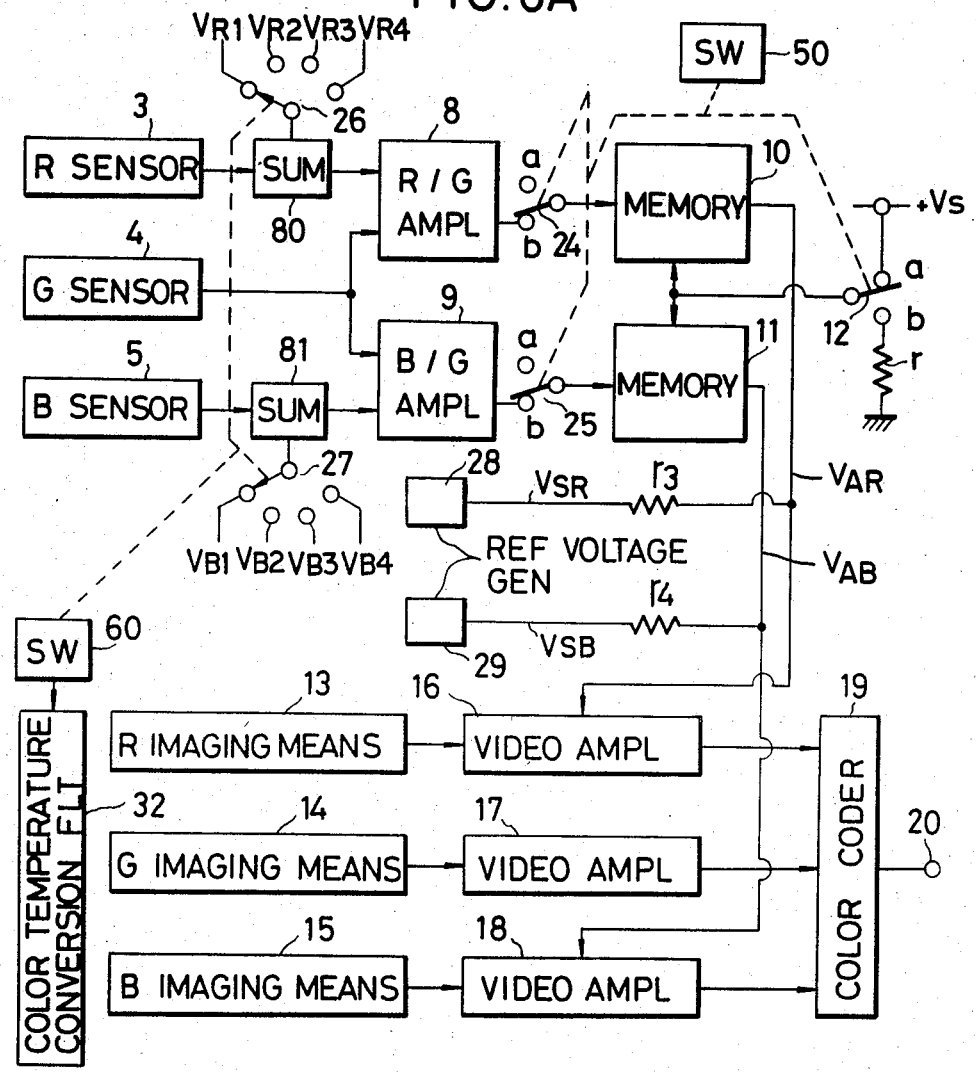
FIGS. 8A and 9 are block diagrams showing different constructions of a TV camera having an automatic follow-up mode, a memory mode and a standard mode to which the invention is applied.
Figure 9:
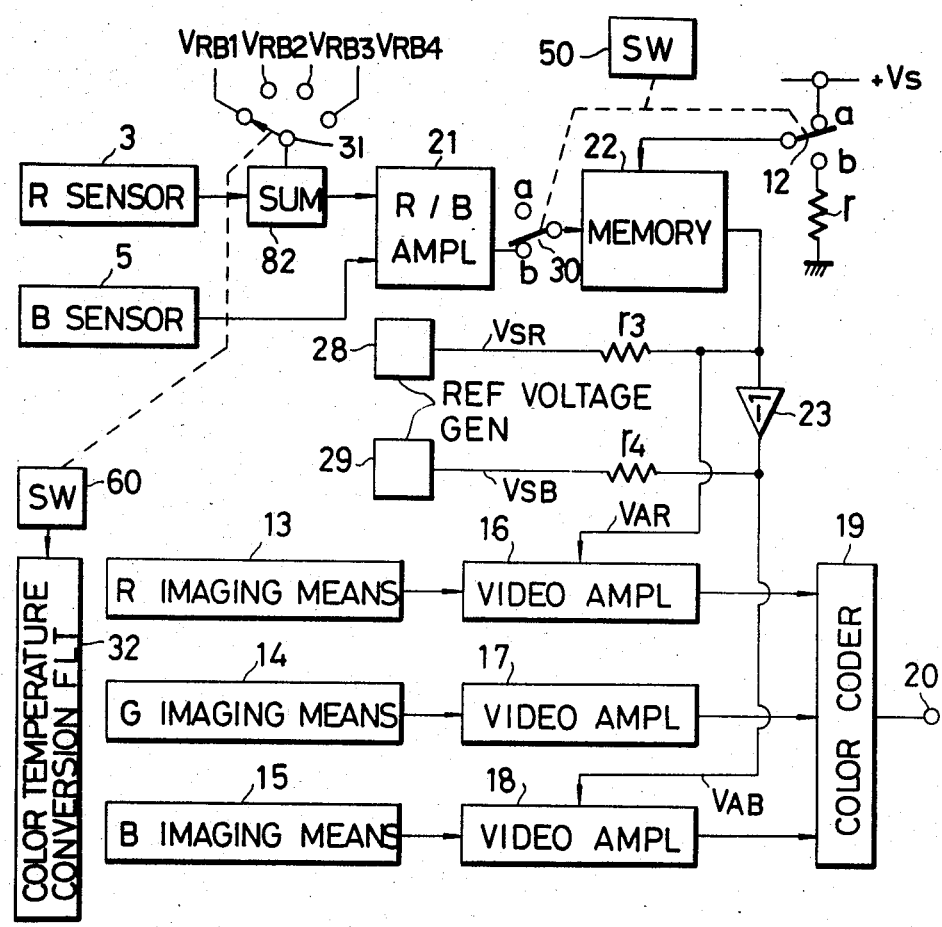

FIGS. 8A and 9 are block diagrams showing the principal parts of another embodiments having, in addition to the automatic follow-up mode and the memory mode, a mode for controlling the gains of the video amplifiers 16 and 18 by means of voltages having different preset values irrespective of the outputs from the light sensor (this is hereinafter referred to as a standard mode). The embodiment of FIG. 8A corresponds to the TV camera of FIG. 3A and the embodiment of FIG. 9 corresponds to the TV camera of FIG. 3B, with the equivalent parts being designated by the same reference numerals in these Figures.

Figure 8B:
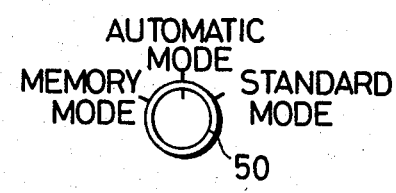
FIG. 8B is a front view showing a specific form of an operating switch.

In FIG. 8A, numerals 24 and 25 designate switches for selecting the standard mode and the switches are operable, along with the mode selector switch 12, by an operating switch 50 mounted, for example, on the side of the TV camera proper. In this case, the operating switch 50 should for example be constructed so that it is operable by a single dial switch as shown in FIG. 8B so as to effect the change-over between the operating modes including the automatic followup, memory and standard modes, thereby simplifying the operation of the mode selection. As illustrated in FIGS. 8A and 8B, when the operating switch 50 is set to the automatic mode, each of the switches 24 and 25 are connected to their respective automatic follow-up contacts b and the mode contact a. When the operating switch 50 is set to the memory mode, the switches 24 and 25 are each connected to its automatic follow-up contact b and the mode selector switch 12 is connected to its memory mode contact b. When the operating switch 50 is set to the standard mode, the switches 24 and 25 are each connected to its standard contact a and the mode selector switch 12 is connected to its automatic follow-up mode contact a.

Figure 8C:
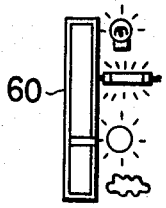
FIG. 8C is a front view showing a specific form of a selector switch.

Numeral 32 designates color temperature conversion filters for converting the color temperature of the light reaching the imaging means 13, 14 and 15 and three kinds of filters for bright sun, heavy overcast and fluorescent light, respectively, are provided. These filters are selected, along with switches 26 and 27 which will be described later, by a selector switch 60 and one of the filters is selectively inserted in the phototaking optical path. The selector switch 60 for the color temperature conversion filters should for example be mounted on the side of the TV camera proper in the form of a sliding operating knob type so as to indicate the selection subjects by means of pictures, symbols, letters or the like. Note that is FIG. 8C the position marked with an incandescent light indicates that none of the color temperature conversion filters is inserted.

The switches 26 and 27 which are operable in association with the selector switch 60 are each so designed that selected one of a set of different predetermined voltages $V_{R1}$, $V_{R2}$, $V_{R3}$ and $V_{R4}$ or $V_{B1}$, $V_{B2}$, $V_{B3}$ and $V_{B4}$ is added to the output voltage of the sensor element 3 or 5 by a summer 80 or 81 and the resulting sum is supplied to the operational amplifier 8 or 9 as shown in FIG. 8A. In other words, the switches 26 and 27 are each so designed that when one of the color temperature conversion filters is inserted in the phototaking optical system, the color temperature of the light reaching the imaging means 13, 14 and 15 is not the same with that of the incident light to the sensor elements 3, 4 and 5 and therefore one of the predetermined voltages is applied to the operational amplifier 8 or 9 so as to shift its output and thereby effectively make the color temperatures equal to each other. For this purpose, one of the combinations of the four different voltages $V_{R1}$, $V_{R2}$, $V_{R3}$, $V_{R4}$ and $V_{B1}$, $V_{B2}$, $V_{B3}$, $V_{B4}$, respectively, is selected in association with the operation of the sliding switch 60 of FIG. 8C in accordance with the selected color temperature conversion filter. Numerals 28 and 29 designate reference voltage generators so designed that predetermined voltages $V_{SR}$ and $V_{SB}$ are respectively supplied to the variable gain control portions of the video amplifiers 16 and 18 through resistors $r_3$ and $r_4$ as shown in the Figure. With the construction described above, where a white or achromatic object illuminated by a light having a color temperature of 3200° K. is detected by the light sensors 3, 4 and 5 and the imaging means 13, 14 and 15, in FIG. 8C the selector switch 60 is set to the position of the incandescent light mark thus inserting no color temperature conversion filter and also the gains of the video amplifiers 16 and 18 and the illustrated control voltages $V_{AR}$ and $V_{AB}$ by the light sensors are adjusted so as to obtain the desired white balance in the automatic follow-up mode. Also, the reference voltages $V_{SR}$ and $V_{SB}$ which are respectively equal to the control voltages $V_{AR}$ and $V_{AB}$ are provided by the reference voltage generators 28 and 29 so as to prevent the flow of current to the resistors $r_3$ and $r_4$. With the TV camera adjusted in this way, in the case of an outdoor shooting in fine weather the sliding switch 60 shown in FIG. 8C selects the color temperature conversion filter for the bright sun and inserts it in the phototaking optical system. As a result, the light is converted to a light of near 3200° K. before reaching the imaging means so that the voltages $V_{R3}$ and $V_{B3}$ are respectively supplied automatically to the operational amplifiers 8 and 9 and their outputs are shifted and generated as signals effectively indicative of the deviation from the color temperature of 3200° K. The gains of the color signals are adjusted automatically by these signals in the like manner as the TV camera of FIG. 3A. Also, in the case of the illumination by a fluorescent light or clouded sky, the corresponding color temperature filter and the corresponding ones of the reference voltage $V_{R1}$ to $V_{R4}$ and $V_{B1}$ to $V_{B4}$ are selected and the similar control as mentioned previously is effected. Also, it is needless to say that the operation in the memory mode is effected in the identical manner as in the case of FIG. 3A.

When the standard mode is selected by the operating switch 50 of the type shown in FIG. 8B, the associated switches 24 and 25 of FIG. 8A are automatically moved to the standard positions or opened. Thus, in this case the gains of the video amplifiers 16 and 18 are controlled only by the predetermined voltages $V_{SR}$ and $V_{SB}$ provided by the reference voltage generators 28 and 29. While these voltages are fixed to obtain the desired white balance at 3200° K., the color temperature conversion filter 32 corresponding to the shooting condition is selected and inserted by the selector switch 60 so that the light arriving at the imaging means 13, 14 and 15 is satisfactorily close to the color temperature of 3200° K. and the desired white balance is practically obtained. Also, this standard mode is very effective when it is desired, for example, to produce a special effect by increasing the reddish tone of a scene illuminated by a light having a color temperature of 2500° K. More specifically, while, in the case of a shooting in the automatic follow-up mode, the white balance corresponding to the light source is obtained thus reducing the reddish tone of the light source, if the standard mode is selected and the color temperature conversion filter switch is set to the incandescent light mark, the desired white balance corresponding to the light source of 3200° K. is automatically obtained. As a result, the red signal is increased as compared with the blue signal by an amount corresponding to the difference of 700° K. and thus a picture having an increased reddish tone can be obtained by means of a very simple operation. Moreover, by providing for example means for detecting the switch position and thereby giving an indication in the viewfinder of the TV camera that the white balance control unit is operating in the automatic, memory or standard mode, it is possible to effect the white balance adjustment with reduced erroneous operation and increased flexibility.

FIG. 9 shows the similar embodiment in which only the R and B light sensors 3 and 5 are used, and numeral 30 designates a standard mode selecting switch of the same effect as the switches 24 and 25 in the embodiment of FIG. 8A. The switch 30 is operated, along with the mode selector switch 12, by the operating switch 50. Numeral 31 designates a shifting switch of the same effect as the switches 26 and 27 in the embodiment of FIG. 8A and it is operatively associated with the selector switch 60 for selecting the proper color temperature conversion filter 32. In the like manner as the summers 80 and 81, a summer 82 produces the sum of one of a set of different predetermined voltages $V_{RB1}$, $V_{RB2}$, $V_{RB3}$ and $V_{RB4}$ and the output voltage of the light sensor 3 and supplies it to an operational amplifier 21.

It is believed that the operation of the embodiment of FIG. 9 is easily understandable from the descriptions of FIGS. 3B and 8A and will not be described further in any detail.

By connecting the circuit shown in FIGS. 5 or 6 to the memory mode contact of the mode selector switch 12 in FIG. 8A or 9, it is possible to overcome the previously mentioned disadvantage, that is, the deviation of the white balance due to the connection of the power source with the mode selector switch 12 being set to the memory mode.

While, in the embodiments of FIGS. 8A and 9, the outputs of the operational amplifiers 8 and 9 or the output of the operational amplifier 21 is shifted in accordance with the kind of the color temperature conversion filter, it is possible to arrange so that a color temperature conversion filter of the equivalent characteristics is also inserted simultaneously for the light sensors. In this case, the switches 26 and 27 or the switch 31 can be eliminated but the arrangement becomes complex. Also, while the color temperature conversion filters are used in the embodiments of FIGS. 8A and 9, the embodiments may be modified so as to eliminate the use of these color temperature conversion filters. More specifically, the reference voltage generators 28 and 29 for controlling the gains of the video amplifiers 16 and 18 in accordance with the preset values may each be adapted to generate a plurality of different predetermined voltages in correspondence to different illuminating lights and the selection of the voltages may be effected by switch means thereby setting the standard mode. In this case, the use of the shifting switches 26, 27 and 31 is eliminated but the dynamic ranges of the video amplifiers 16, 17 and 18 and the operational amplifiers 8 and 9 must be increased.

FIG. 10 shows another embodiment of the invention which overcomes the previously mentioned disadvantage of the embodiments in FIGS. 8A and 9 from the mechanical point of view. This embodiment is basically the same with the one shown in FIG. 7 and will not be described. Further, while, in the foregoing description, the invention is applied to a three tube-type TV camera, the invention is not intended to be limited to it and it is needless to say that the invention is applicable to single tube-type and two tube-type TV cameras as well as single plate-type, two plate-type and three plate-type TV cameras using solid-state imaging devices and that the same effects as mentioned previously can be obtained. Further, while, in the two embodiments shown in FIGS. 8A and 9, the different kinds of color temperature conversion filters 32 are provided so as to effect the very fine white balance adjustments, the number of these filter is not limited and it is conceivable to use for example one or two kinds of filters depending on the intended application. Similarly, the number of voltage outputs to be selected by each of the switches 26, 27 and 31 in the embodiment of FIG. 8A and 9 is not limited to the previously mentioned four voltages.

Further, while, in the foregoing description, the output ratios R/G and B/G or R/B of the light sensors 3, 4 and 5 are computed and the white balance adjustment is effected in accordance therewith, the invention is not intended to be limited thereto and it is possible to subject the outputs of the light sensors to logarithmic transformation and then compute the differences therebetween. These computations may be performed by using any desired combinations of the R, G and B signals, and it is also possible to arrange so that the use of such computing means is eliminated and the gains of the video amplifiers are directly controlled in accordance with the outputs of the light sensors.

FIG. 11 shows another embodiment of the invention which differs from the embodiment of FIG. 7 in that in response to the connection of the power source a solenoid 73' is energized for a predetermined time and the plunger 74 is moved to the right in the Figure for the predetermined time. In this embodiment, the component elements which are different from FIG. 7 include the solenoid 73', a timer 61 and a switch circuit 90. When the switch 30 is closed, the timer 61 generates a H signal for the predetermined time during which the switch circuit 90 is energized and thus the solenoid 73' is energized for the predetermined time. Differing from the solenoid 73 in the embodiment of FIG. 10, the solenoid 73' has the function of moving the plunger 74 to the right in the Figure during the energization thereof.

Figure 12:
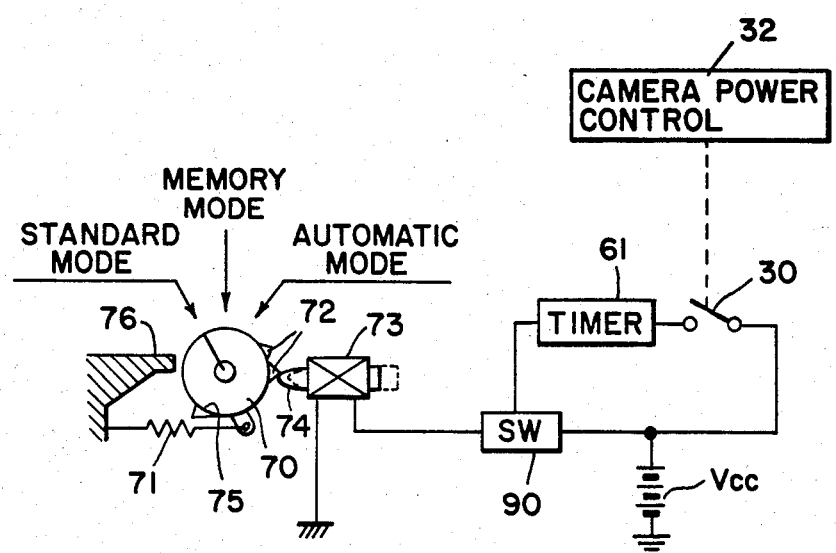
FIG. 12 is another schematic diagram showing the switchover device of the present invention.

FIG. 12 illustrates a further embodiment wherein the solenoid 73 is energized for a predetermined time when camera power control 32 is activated such that the automatic mode is selected at power up regardless of the mode earlier selected. After a time determined by timer 61, the solenoid is de-energized and switch 70 can be used to select the standard mode, the memory mode or the automatic mode.

From the foregoing description it will be seen that in accordance with the present invention there is a great effect that under the ordinary shooting condition where the previously mentioned assumption is satisfied the color temperature is continuously detected by color temperature detecting light sensors so as to continuously control the gains of color signals and thereby continuously and automatically adjust the white balance to the optimum, and under a special shooting condition where the assumption is not satisfied the white balance is maintained constant by means of a simple operation, thereby effecting the desired adjustments to obtain the optimum white balance under all the shooting conditions and also preventing the white balance adjustment from being disturbed when the power source is connected with the memory mode being selected.

What is claimed is:

1. A color television camera comprising:
   (a) generation means for generating color signals of an object to be shot;
   (b) detecting means for detecting a color temperature of a light illuminating said object and generating at least one detection signal in accordance with said detected color temperature;
   (c) control means for controlling said generating means so as to adjust the colors of a picture in accordance with said detection signal;
   (d) memory means having automatic and memory control modes, said memory means transmitting said detection signal to said control means in said automatic control mode, and said memory means storing said detection signal and outputting said stored detection signal to said control means in said memory control mode;
   (e) selection means adapted to select one of said automatic and memory control modes of said memory means;
   (f) power source means for energizing said camera; and
   (g) change means responsive to the energizing of said camera by said power source means to change over said memory means to said automatic control mode irrespective of said memory control mode selected by said selection means.

2. A color television camera according to claim 1, wherein said change means includes timer means responsive to said energizing of said camera by said power source means so as to hold said memory means in said automatic control mode for a predetermined time and then change over to said memory control mode.

3. A color television camera according to claim 1, further comprising:
   (a) shooting starting means adapted to be operated to cause said color television camera to start a shooting when said color television camera has been energized; and
   (b) means responsive to said starting of shooting to hold said memory means in the preliminarily selected mode in accordance with said change means.

4. A color television camera according to claim 1, wherein said generation means generates said color signals in accordance with the color temperature of said object and
wherein said color television camera further includes:
   (a) filter means having a plurality of color temperature conversion filters for converting the color temperature of said object including means for selecting one of said plurality of color temperature conversion filters; and
   (b) means including a plurality of potential levels for adding one of said plurality of potential levels to said detection signal in response to the color temperature conversion fitler selected by said filter means.

5. A color television camera comprising:
   (a) generating means for generating color signals of an object to be shot;

(b) detecting means for detecting a color temperature of a light illuminating said object and generating at least one detection signal in accordance with said detected color temperature;

(c) control means for controlling said generation means so as to adjust the colors of a picture in accordance with said detection signal;

(d) memory means having automatic and memory control modes, said memory means transmitting said detection signal to said control means in said automatic control mode, said memory means storing said detection signal and outputting said stored detection signal to said control means in said memory control mode;

(e) selection means adapted to select one of said automatic and memory control modes of said memory means;

(f) power source means for energizing said camera and deenergizing said camera; and (g) changing means responsive to said deenergizing of said camera by said power source means to change over said selection means to the first control mode when the second control mode has been selected.

6. A color television camera according to claim 5 wherein said selection means is displaceable between a first position for said memory control mode and a second position for said automatic control mode; and wherein said changing means includes:

(a) means for biasing said selection means from said first position toward said second position;

(b) means for holding said selection means in said first position; and (c) means responsive to the deenergizing of said camera by said power source means to release the holding of said selection means by said holding means.

7. A color television camera according to claim 5, wherein said generation means generates said color signals in accordance with the color temperature of said object; and wherein said color television camera further includes:

(a) filter means having a plurality of color temperature conversion filters for converting the color temperature of said object including means for selecting one of said plurality of color temperature conversion filters; and (b) means having a plurality of potential levels for adding one of said plurality of potential levels to said detection signal in response to the color temperatures conversion filter selected by said filter means.

8. A color television camera comprising:

(a) means for generating color signals of an object to be shot;

(b) detecting means for detecting a color temperature of alight illuminating said object and generating at least one color temperature signal in accordance with said detected color temperature;

(c) memory means for storing said color temperature signal and outputting said stored color temperature signal;

(d) setting means for controllably setting said color temperature signal in accordance with a predetermined color temperature and outputtting the same;

(e) control means responsive to said control temperature signal so as to control said color signals and thereby adjust the colors of a picture;

(f) selection means adapted to select one of an automatic, memory and standard control modes, said memory means transmitting said color temperature signal to said control means in response to the selection of said automatic control mode, said memory means storing said color temperature signal and outputting said color temperature signal to said control means in response to the selection of said memory control mode, and said setting means outputting the set color temperature signal to said control means in response to the selection of said standard control mode;

(g) power source means for energizing said camera; and (h) change means responsive to said energizing of said camera by said power source means to change over said memory means to the automatic control mode irrespective of said memory control mode selected by said selection means.

9. A color television camera comprising:

(a) means for generating color signals of an object to be shot;

(b) detecting means for detecting a color temperature of a light illuminating said object and generating at least one color temperature signal in accordance with said detected color temperature;

(c) memory means for storing said color temperature signal and outputting the stored color temperature signal;

(d) setting means for controllably setting said color temperature signal in accordance with a predetermined color temperature and outputting the same;

(e) control means responsive to said color temperature signal so as to control said color signals and thereby adjust the colors of a picture;

(f) selection means adapted to select one of an automatic, memory and standard control modes, said memory means transmitting said color temperature signal to said control means in response to the selection of said automatic control mode, said memory means storing said color temperature signal and outputting said color temperature signal to said control means in response to the selection of said memory control mode, and said setting means outputting the set color temperature signal to said control means in response to the selection of said standard control mode;

(g) power source means for energizing said camera and deenergizing said camera; and (h) change means responsive to said deenergizing of said camera by said power source means to change over said selection means to the first control mode when the second control mode has been selected.

* * * * *